(12) United States Patent
Ramsay

(10) Patent No.: US 6,932,690 B2
(45) Date of Patent: Aug. 23, 2005

(54) ADJUSTABLE ROOF VENTILATOR JACK (76) Inventor: Jean-Rock Ramsay, 9229, Pierre-Bonne, Montreal, Que (CA), H1E 7J6

(*) Notice: Subject to any disclaimer, the term of this patent is extended or adjusted under 35 U.S.C. 154(b) by 0 days.

(21) Appl. No.: 10/851,238
(22) Filed: May 24, 2004

(65) Prior Publication Data
US 2004/0235412 A1 Nov. 25, 2004

(30) Foreign Application Priority Data
May 23, 2003 (GB) .......................................... 0311843

(51) Int. Cl.[7] .............................................. F23L 17/12
(52) U.S. Cl. .......................................... 454/66; 285/44
(58) Field of Search ............................ 454/366, 18, 19; 285/44, 184, 181, 185

(56) References Cited

U.S. PATENT DOCUMENTS

| | | | | |
|---|---|---|---|---|
| 1,145,598 A | * | 7/1915 | Laboudigue | 285/44 |
| 2,909,113 A | * | 10/1959 | Hatcher | 454/36 |
| 3,742,659 A | * | 7/1973 | Drew | 52/19 |
| 4,526,091 A | * | 7/1985 | Sharp | 454/254 |
| 4,781,401 A | * | 11/1988 | Sharp | 285/44 |
| 5,375,891 A | * | 12/1994 | Sicotte et al. | 285/148.22 |
| 5,409,266 A | * | 4/1995 | Baker | 285/44 |

* cited by examiner

Primary Examiner—Harold Joyce (57) ABSTRACT

An adjustable roof ventilator jack for operationally coupling a roof ventilator to a venting aperture extending through a sloped roof. The jack includes a base section having base section front, rear and side walls. The base section is configured so as to be angled in a direction opposite the slope of the roof. The jack also includes a pivotable section having pivotable section front and side walls. The pivotable section front wall is pivotally attached to the base section for pivotal movement between an extended configuration wherein the pivotable and base section front walls are in a substantially parallel relationship relative to each other and a retracted configuration wherein the inner surface of the pivotable and base section front walls form an obtuse angle. The jack further includes a position lock for selectively locking the base and pivotable sections in a predetermined angular relationship relative to each other.

20 Claims, 11 Drawing Sheets

ADJUSTABLE ROOF VENTILATOR JACK

FIELD OF THE INVENTION

The present invention relates to the general field of roof ventilation and is particularly concerned with an adjustable ventilator roof jack.

BACKGROUND OF THE INVENTION

Energy-efficiency is a serious consideration in building design and construction. Many building codes require builders to minimize energy requirements to maintain comfortable living spaces.

One of the most common energy loss in a building is due to the heat transfer through the attic. In warm climates, heat builds up in the attic from solar energy incident on the roof or from heat transferred up from the living space. If the attic is allowed to become too warm, the installed insulation becomes ineffective and the attic heat is transferred to the living space below.

In colder climates, moisture builds up in the attic, sometimes significantly decreasing the efficiency of the insulation. The moisture, regardless of its numerous potential origins, left unchecked will build up and potentially cause extensive damage within the structure. Moisture originating from the shower, kitchen steam or the like not only potentially decreases the insulating value of insulation, but also potentially leads to mould and mildew growth.

Hence, it is well known in the home building industry that proper circulation of air within the attic zone and above the level at which the insulation is installed is essential to avoid moisture build-up during cold winter months and to maintain the un-insulated attic space at a reasonably low temperature during warm summer months. Early efforts at minimizing energy losses through the attic focused on the insulation between the living space and the attic and ignored the effects of the heat and/or moisture build-up. As insulation improved, a point was reached where more insulation was not necessarily better or possible due to space limitations.

Numerous attempts have been made to alleviate this problem by installing vents at various points in the roofing structure. One common technique is to include vents or venting apertures on the underside of the soffite of the roof as, for example, on the underside of the eaves. While this practice allows some of the heat to escape, the ventilation provided remains poor. Indeed, because the vents are located on the underside of the eaves, the heat must build up to relatively high levels before it is forced downwardly out of the vents due to the fact that heat naturally rises. This also causes non-uniform heat distribution within the attic or roof structure.

Since the heat rises, the temperature closest to the roof will consistently remain at temperatures higher that that of the areas further away from the roof and near the eaves. Also, in sloped roof structures, the heat will concentrate adjacent the apex creating higher temperatures of the apex, which steadily decrease along the roof line toward the eaves. Hence, the air allowed to escape at the eaves is not even the hottest air.

Other attempts have been made to increase ventilation. In one common technique, a venting aperture is cut in various parts of the roof and then covered with a box-like ventilation duct. Static roof ventilators also commonly referred to as "pot vents" typically include three main components. Conventional pot vents typically include a flange or base portion, a conduit or duct portion and a hood or cover portion.

The flange is nailed or otherwise secured to the roof deck over a similarly sized aperture as with the conduit portion. Typically, the leading edge of the flange is positioned over a course of shingles, while additional courses are laid over the flange and cut to fit around the conduit. The hood portion, which is rigidly attached to the flange, prevents moisture penetration in most cases.

Turbine-type roof ventilators are also sometimes used. These turbine roof ventilators typically include a sleeve on the top end of which is mounted a rotatable turbine fluid. Typically, the turbine fluid includes a closed circular, usually convex upper end which prevents ingress of rain into the sleeve and thus into the roof chamber, a lower ring and a series of arcuate turbine blades extending from the lower ring to the upper end through which hot air flows. The turbine blades are rotatable either due to winds or breezes or to the flow of air from out under the roof through the turbine.

Whether of the turbine or static type, most roof ventilators are typically constructed for a given predetermined roof slope or pitch. So-called roof jacks are sometimes provided to connect the outlet of the roof-mounted air handler such as a ventilator to an air duct which emerges from the roof. Prior art roof jacks are typically constructed to couple the typically horizontally oriented aperture at the bottom of the ventilator to the slope or pitch of the roof. Generally each roof jack must be specifically constructed to fit the slope or pitch of the roof upon which it is to be used.

Accordingly, roof jack suppliers are required to maintain a relatively large inventory of roof jacks in order to accommodate the full range of slopes or pitch which are encountered in the building industry. Roof jacks suppliers must also stock roof jacks having different sizes in terms of cross-section in order to meet the needs of various duct and exhaust outlet sizes which are encountered in roof-mounted ventilators.

Consequently, roof jack suppliers are faced with the problem of high costs and high storage space if they want to be able to supply roof jacks accommodating the full range of slopes and cross-sectional diameters encountered in the industry.

Even in cases wherein a given stock roof jack is available and used for a given roof pitch or slope, the slope of the roof may be slightly deviant from the design value and the stock roof jack may not fit the angle perfectly. In such cases, the misfit may cause air leakage from the system or may cause the ventilator to be mounted at a slight angle which could, in turn, cause problems in operation of the ventilator. Accordingly, there exists a need for and adjustable ventilator roof jack.

The prior art has recognized the need for adjustability of roof jacks and, hence, several patents disclose different types of adjustable structures. For example, U.S. Pat. No. 4,526,091 naming Ronald W. Sharp as inventor and issued Jul. 2, 1985 discloses an adjustable roof jack wherein a single sheet metal pattern comprises a portion of the lower and upper section of duct and wherein the duct sections are connected, each to the other, by means of a sheet metal bend hinge in a single sheet metal pattern thereby allowing adjustment of the angle between the upper and lower duct sections.

Also, U.S. Pat. No. 5,409,266 naming George C. Baker as inventor and issued Apr. 25, 1995 discloses an adjustable roof jack including a lower rectangular box-like member which is attached to the roof. An upper rectangular box-like member is made for attachment to a roof-mounted air handler. The front and side of the upper box-like member extend downwardly over the corresponding side and front of the lower roof-mounted member. The upper member is pivotally connected to the lower member at pivot points located through the side, intermediate front and back of the two members. The front of the members faces the center or higher portion of the roof and the edge of the front of the upper member is folded into an S-shaped configuration. The upper edge of the front of the lower member extends into a pocket in the S-shaped configuration to provide a sliding seal between the two parts as the upper member is pivoted relative to the lower member to accommodate the roof pitch.

Although allowing for some degree of angle adjustability, these prior art devices nevertheless suffer from numerous drawbacks. One of these problems is that they are inherently limited by their structural design in terms of range of angular adjustability.

Also, the configuration of some prior art adjustable roof jacks sometimes leads to losses or reductions in terms of effective cross-sectional area through which the air may flow when the roof jack is bent so as to provide for angle adjustability. The configuration of some prior art adjustable roof jacks sometimes unduly restricts the flow of air and/or creates air leaks.

Furthermore, some prior art adjustable roof jacks suffer from being made out of at least two or three independent components that must be assembled together either at the manufacturing site or at the installation site. This not only leads to increased manufacturing, installation or operational costs but also eventually leads to leakage between the assembled components. Accordingly, there exists a need for an improved adjustable ventilator roof jack.

Advantages of the present invention include that the proposed roof jack allows for the connection of a roof-mounted air handler such as a ventilator to an air duct extending through roofs of various slopes or pitch. The proposed roof jack allows for angular adjustability through a set of quick and ergonomic steps without requiring special tooling or manual dexterity. Also, the proposed roof jack allows for angular adjustment thereof prior to being installed on the roof, hence reducing the overall installation time.

Still furthermore, the proposed roof jack allows for angular adjustability with minimal compromise of the cross-sectional effective area through which the air is guided and with minimal flow obstruction and leakage. Yet, still furthermore, the proposed ventilator roof jack is designed so as to reduce the risks of leakage through its sections and so as to be manufacturable through conventional forms of manufacturing using a reduced number of components, hence providing a roof-jack that will be economically feasible, long-lasting and relatively trouble-free in operation.

BRIEF DESCRIPTION OF THE DRAWINGS

An embodiment of the present invention will now be disclosed, by way of example, in reference to the following drawings, in which:

FIG. 4, in a side elevational view, illustrates an adjustable roof ventilator jack in accordance with an embodiment of the present invention, the jack being shown with a pivotable section thereof in a retracted configuration;

DETAILED DESCRIPTION

Figure 1:
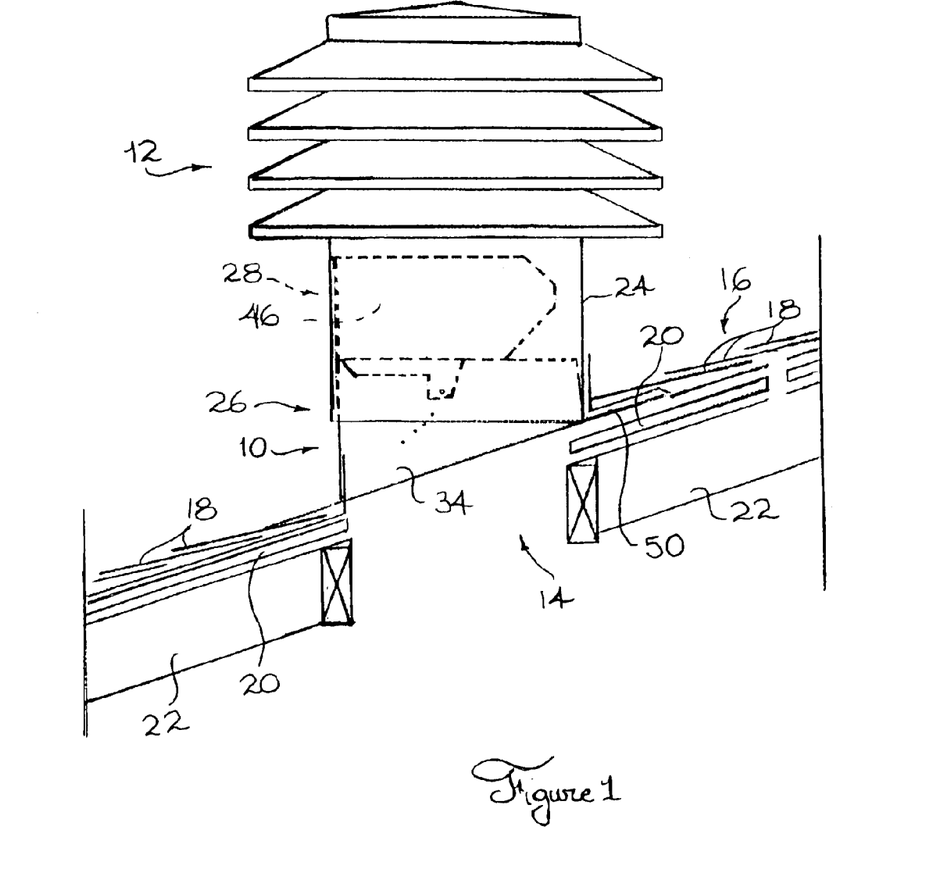
FIG. 1, in a partial elevational view with sections taken out, illustrates an adjustable roof ventilation jack in accordance with an embodiment of the present invention, the jack being shown supporting a conventional static ventilator over a venting aperture formed in a slightly sloped roof, the jack being shown with a pivotable section thereof in an extended configuration.
Figure 2:
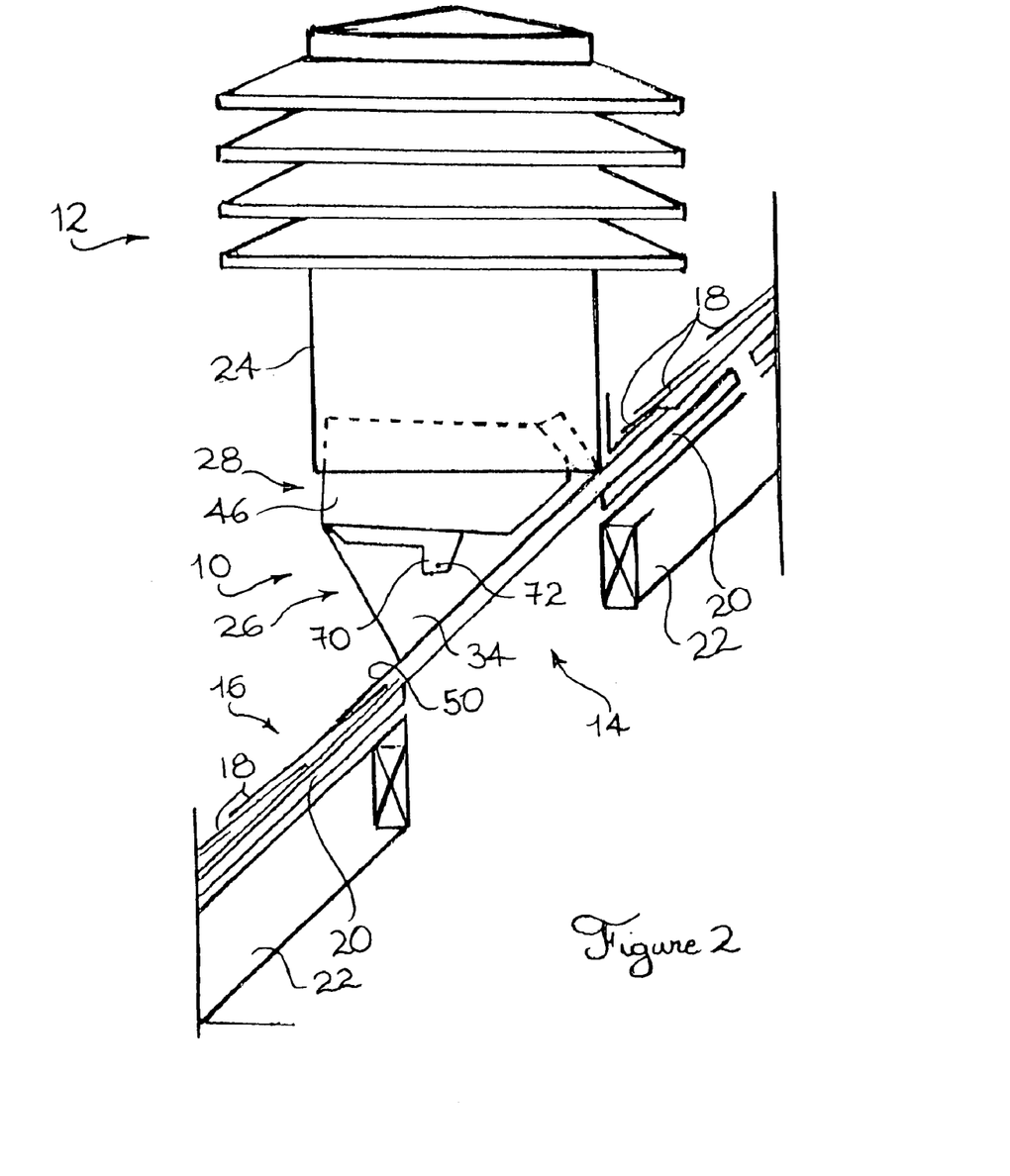
FIG. 2, in a partial elevational view with sections taken out, illustrates the jack shown in FIG. 1 mounted on a roof having a more pronounced slope and with its pivotable section in a retracted configuration.

Referring to FIGS. 1 and 2, there is shown an adjustable roof ventilator jack in accordance with an embodiment of the present invention generally designated by the reference numeral 10. The jack 10 is shown operationally coupling a roof ventilator 12 to a venting aperture 14 extending through a roof 16. The jack 10 is particularly well-suited for use on a roof having a sloped roof section adjacent the venting aperture 14.

FIGS. 1 and 2 illustrate situations wherein the jack 10 is mounted on roofs 16 having respectively a less and a more pronounced slope. It should be understood that the roof slopes illustrated in FIGS. 1 and 2 are only shown by way of example and that the jack 10 could be used with roofs having other slope values without departing from the scope of the present invention.

In FIGS. 1 and 2, the venting aperture 14 establishes fluid communication between an interior volume such as an attic and an external environment such as the exterior of a building. It should, however, be understood that the jack 10 could be used with other types of venting aperture establishing fluid communications between other types of environments without departing from the scope of the present invention.

In FIGS. 1 and 2, the jack 10 is shown mounted on a roof 16 including an exterior roof surfacing such as shingles 18 secured to a roof panel 20 attached to structural beams 22. It should, however, be understood that the jack 10 could be used with roofs 16 having other types of constructions and/or exterior roof surfacing without departing from the scope of the present invention.

In FIGS. 1 and 2, the jack 10 is shown supporting a specific type of static ventilator 12 such as the static ventilator disclosed in U.S. Pat. No. 4,572,059 incorporated herein in its entirety by reference. It should, however, be understood that the jack 10 could be used for supporting other types of ventilators without departing from the scope of the present invention.

Typically, the ventilator 12 includes a substantially cylindrical ventilator base section defining a ventilator base section peripheral wall 24.

Figure 10:
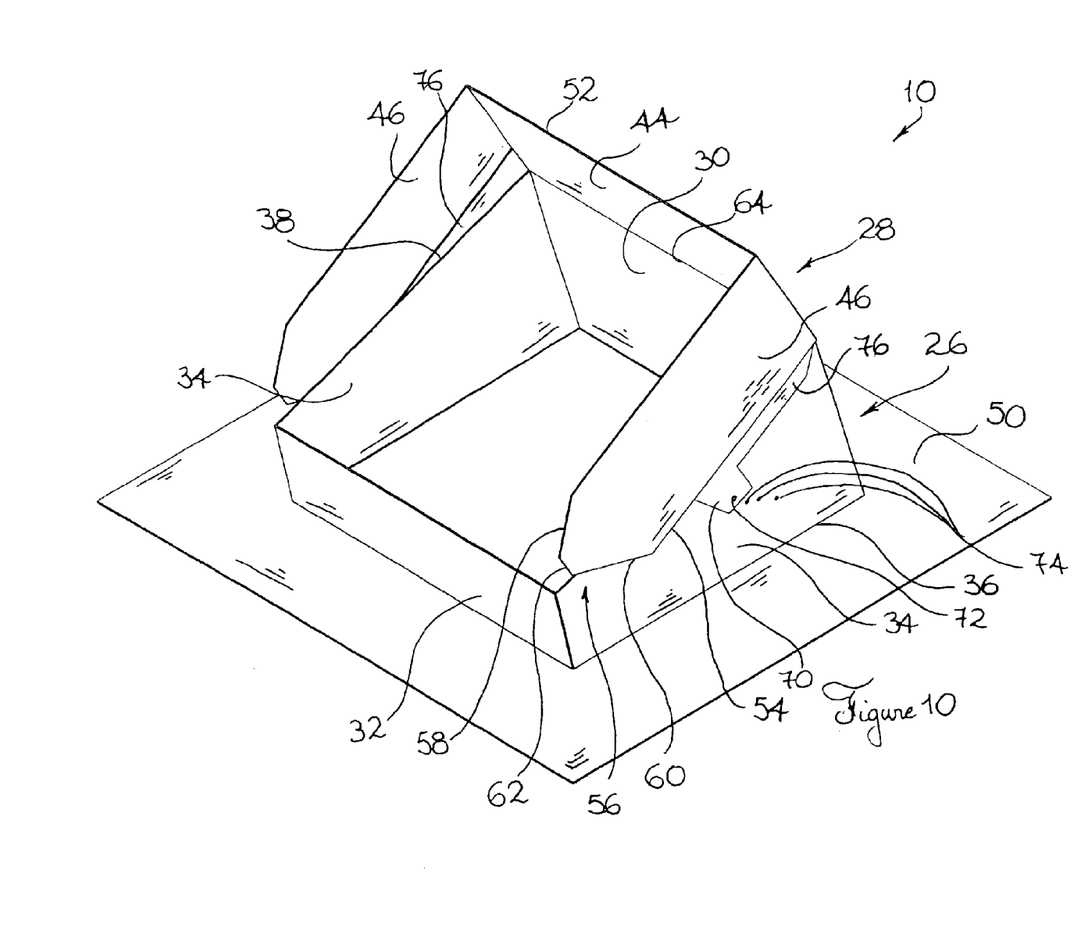
FIG. 10, in a front-top perspective view, illustrates the ventilaton jack shown in FIG. 9.
Figure 11:
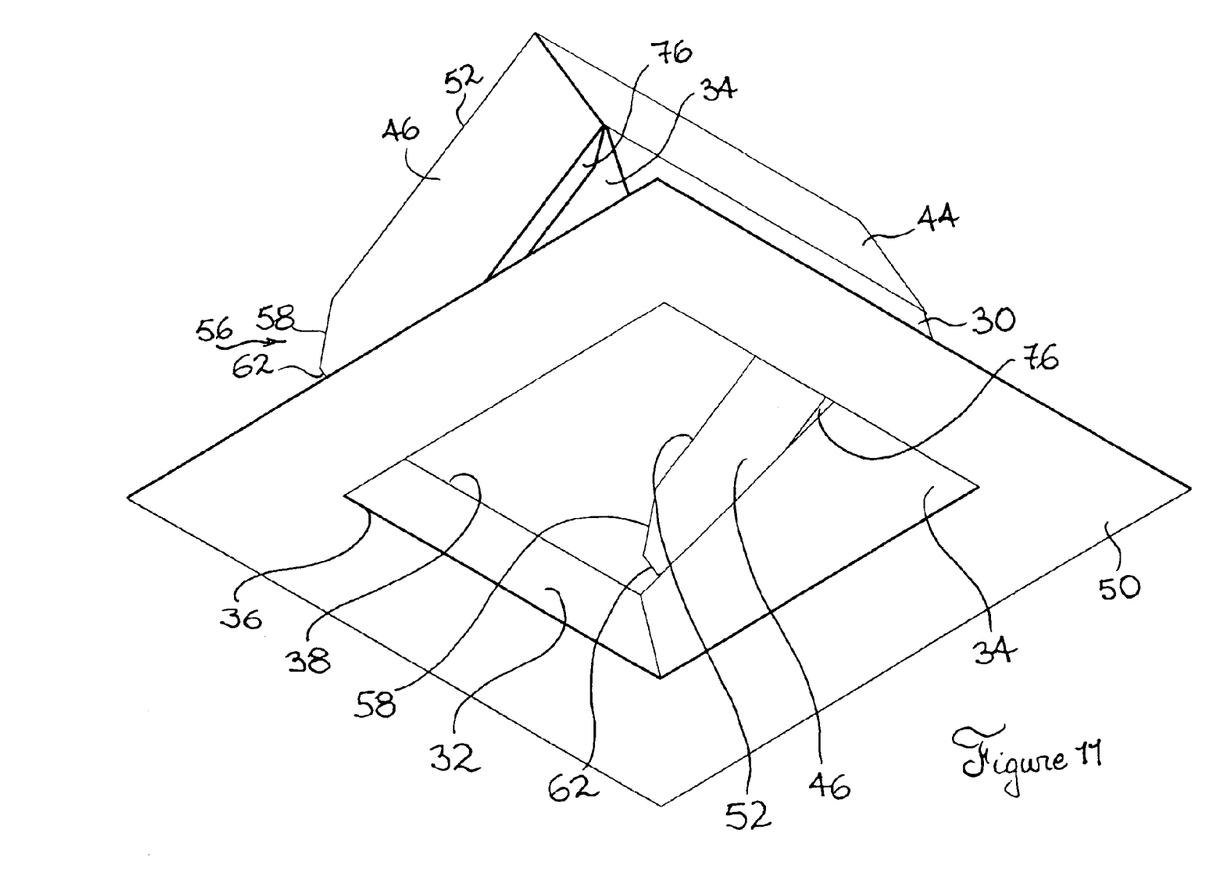
FIG. 11, in a rear-bottom perspective view, illustrates the ventilator jack shown in FIGS. 9 and 10.
Figure 12:
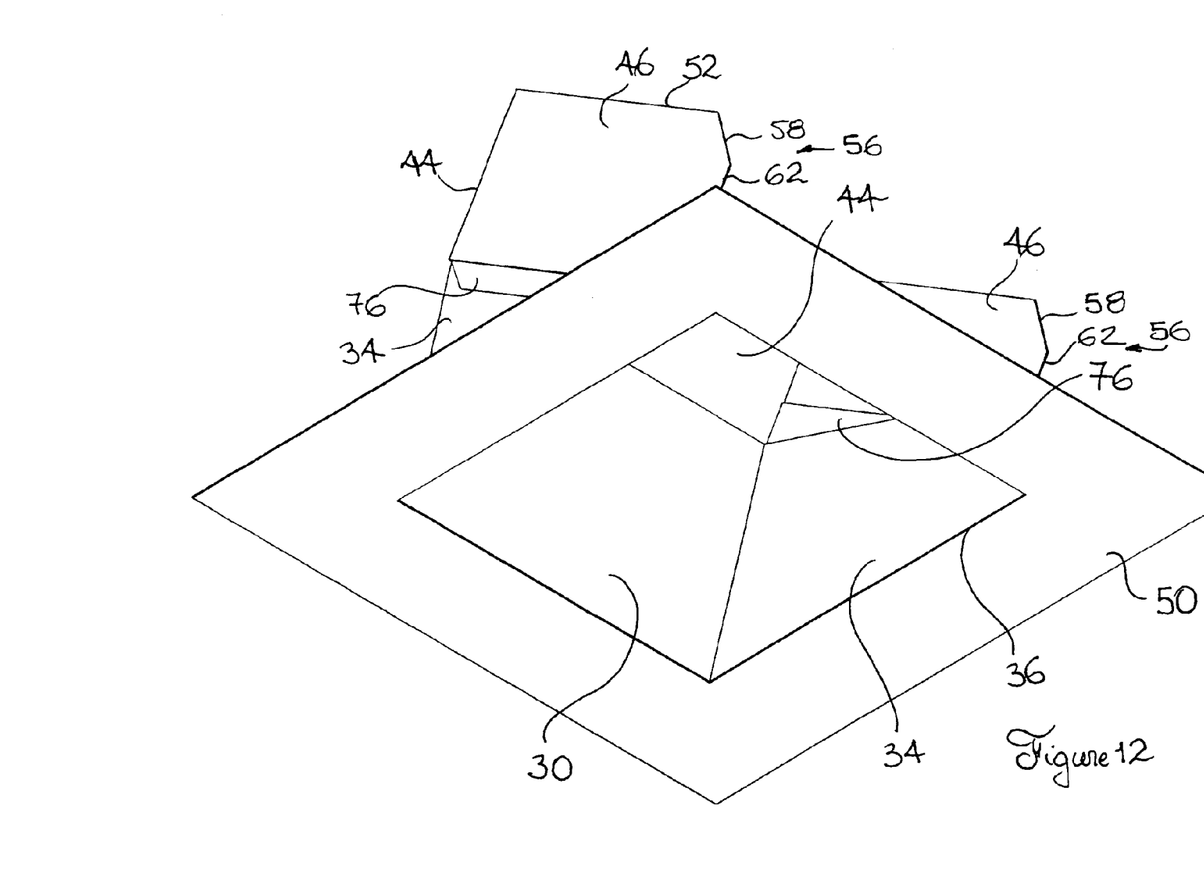
FIG. 12, in a front-bottom perspective view, illustrates the ventilator jack shown in FIGS. 9 through 11.

As illustrated more specifically in FIG. 10, the jack 10 includes a base section 26 and a pivotable section 28 pivotally attached to the base section 26. The base section 26 includes a base section front wall 30, a substantially opposed base section rear wall 32. The base section 26 also includes a pair of substantially opposed base section side walls 34 extending between the base section front and rear walls 30, 32.

The base section 26 further defines a base section lower peripheral edge 36 and an opposed base section upper peripheral edge 38. The base section lower peripheral edge 36 extends in a base reference plane.

Figure 3:
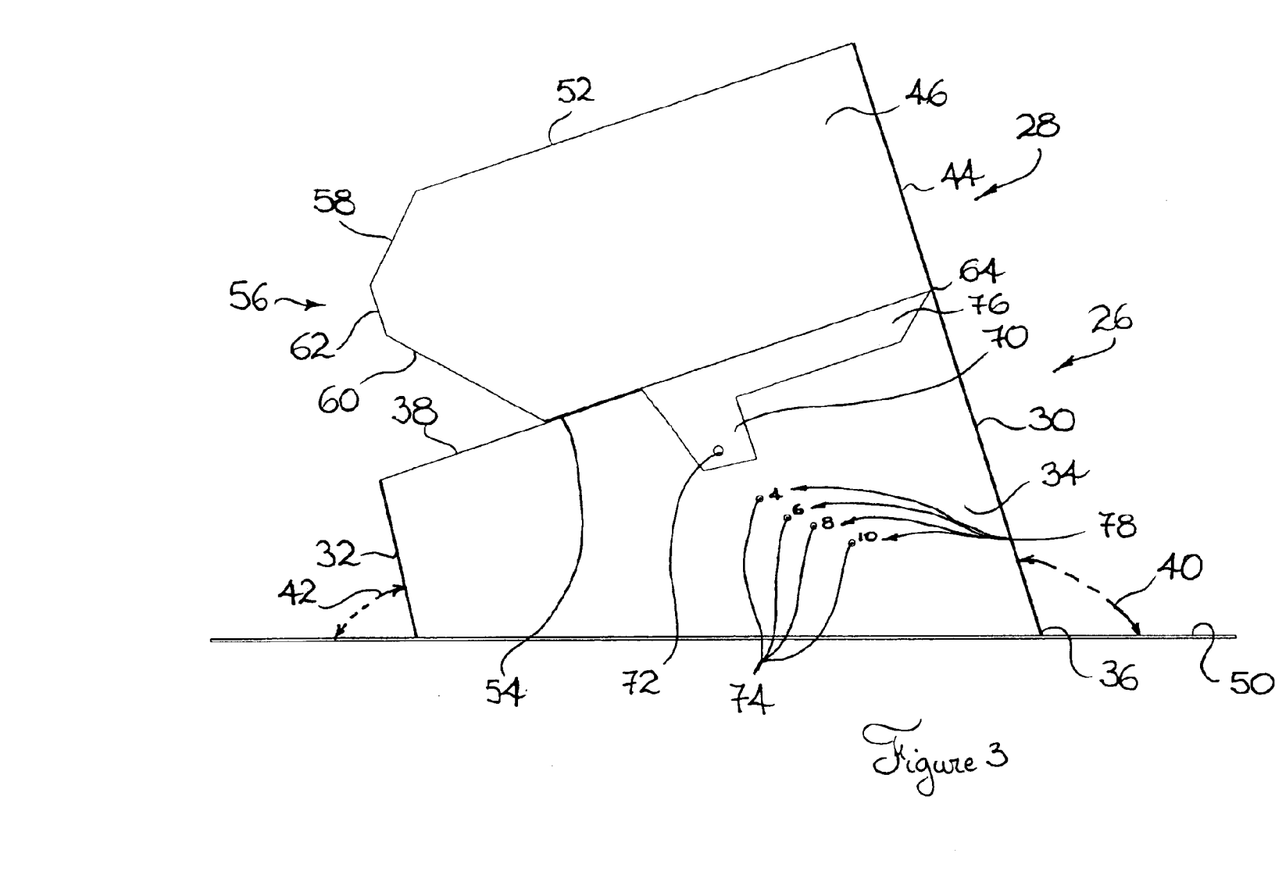
FIG. 3, in a side elevational view, illustrates an adjustable roof ventilator jack in accordance with an embodiment of the present invention, the jack being shown with a pivotable section thereof in an extended configuration.
Figure 5:
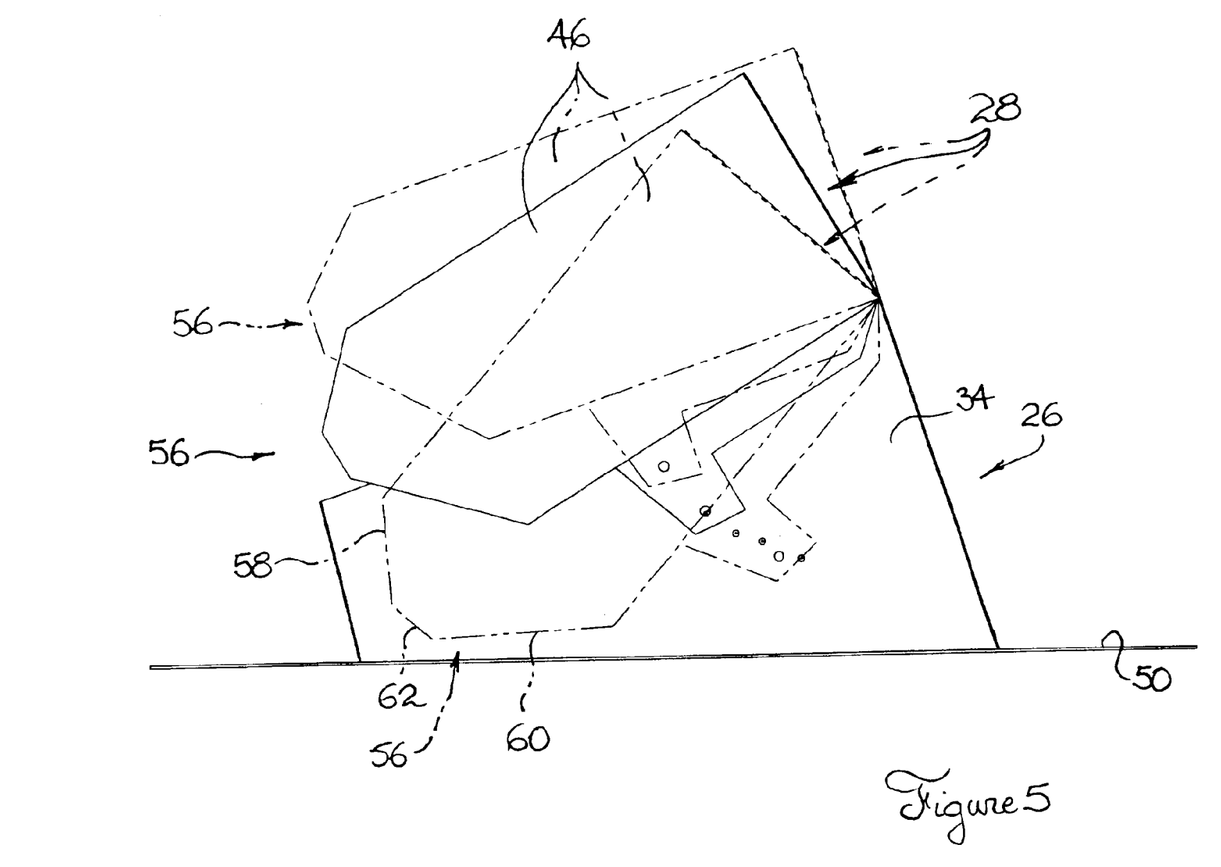
FIG. 5, in a side elevational view, illustrates an adjustable roof ventilator jack in accordance with an embodiment of the present invention, the jack being shown with a pivotable section thereof shown in full lines in an intermediate position and in phantom lines in a variety of other positions.
Figure 6:
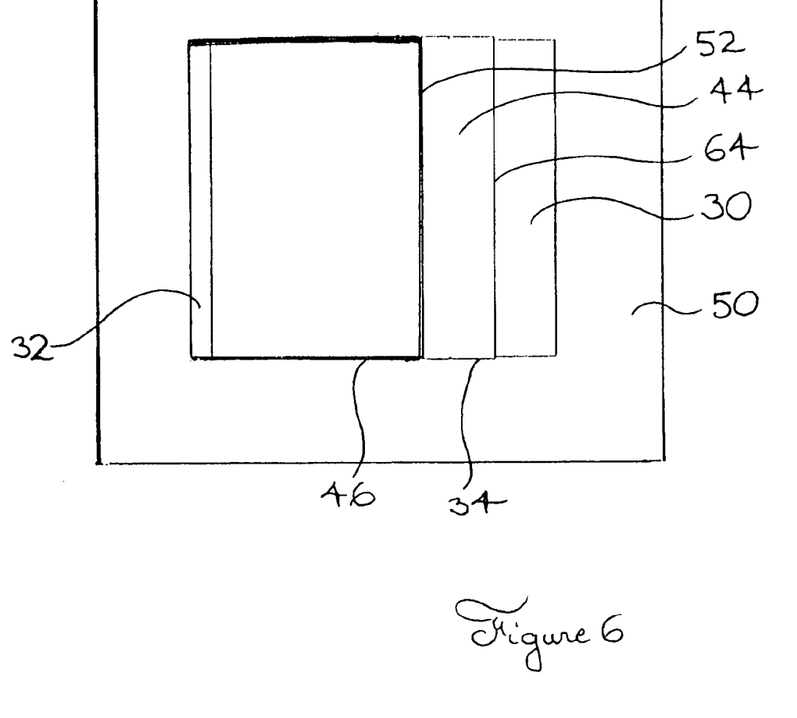
FIG. 6, in a top view, illustrates an adjustable roof ventilator jack in accordance with an embodiment of the present invention.
Figure 7:
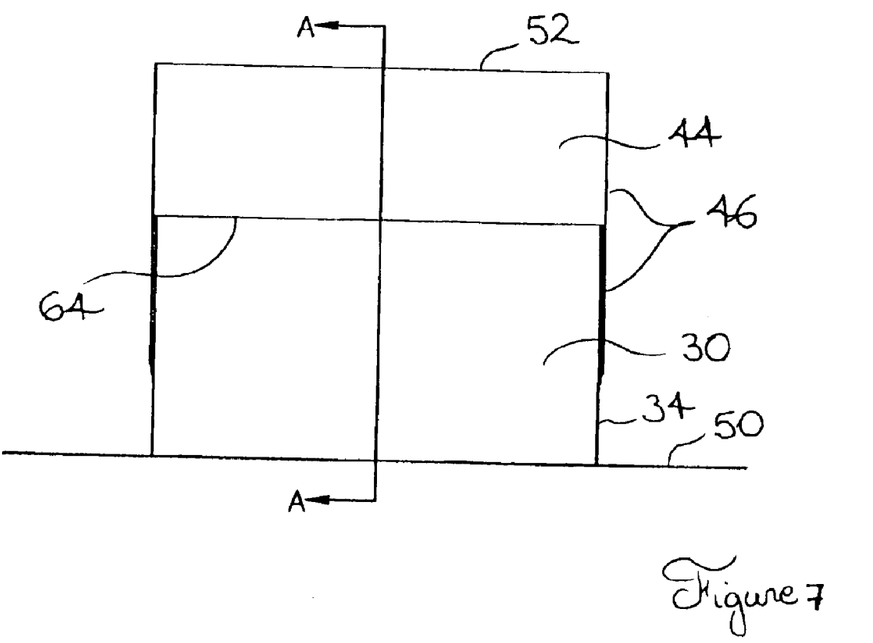
FIG. 7, in a rear view, illustrates an adjustable roof ventilator jack in accordance with an embodiment of the present invention.

As illustrated more specifically in FIGS. 3 through 5, the outer surface of the base section front and rear walls 30, 32 form respectively an obtuse front wall-to-reference plane angle 40 and a substantially complementary acute rear wall-to-reference plane angle 42 relative to the base reference plane. Also, the distance between the base section upper and lower peripheral edges 38, 36 is greater about the base section front wall 30 than about the base section rear wall 32. Hence, as illustrated in FIGS. 1 and 2, when the base section 26 is mounted on a sloped roof 16, the base section 26 typically compensates at partially for the slope of the sloped roof 16.

As shown more specifically in FIG. 10, the pivotable section 28 includes a pivotable section front wall 44. The pivotable section 28 also includes a pair of pivotable section side walls 46 extending substantially rearwardly from the pivotable section front wall 44.

The pivotable section front wall 44 is pivotally attached to the base section 26 for pivotal movement between an extended configuration shown in FIGS. 1 and 3 and a retracted configuration shown in FIGS. 2 and 4. In the extended configuration, the pivotable and base section front walls 44, 30 are in a substantially parallel relationship relative to each other. In the retracted configuration, the inner surface of the pivotable and base section front walls 44, 30 form a pivotable-to-base section angle having a value smaller than 180 degrees.

As illustrated more specifically in FIG. 4, typically, the pivotable-base section angle 48 is an obtuse angle.

The jack 10 typically further includes a jack-to-roof attachment for attaching the base section 26 to the roof 16. Typically, the jack-to-roof attachment includes an attachment flange 50 extending substantially outwardly from the base section 26 substantially adjacent the base section lower peripheral edge 36. Typically, the attachment flange 50 extends substantially in the base reference plane. Also, the attachment flange 50 typically extends integrally from the base section lower peripheral edge 36.

The pivotable section 28 defines a pivotable section upper peripheral edge 52 and a substantially opposed pivotable section lower peripheral edge 54. As illustrated more specifically in FIG. 3, the pivotable section upper and lower peripheral edges 52, 54 are configured and sized so as to be in a substantially parallel relationship relative to the base section upper peripheral edge 38 when the pivotable section front wall 44 is in the extended configuration.

Each pivotable section side wall 46 defines a corresponding side wall distal edge 56 located substantially opposite the pivotable section front wall 44. As illustrated more specifically in FIG. 5, each side wall distal edge 56 is configured and sized so as to provide clearance for the pivotable section 28 as the pivotable section front wall 44 pivots between the extended and retracted configurations. As illustrated in FIG. 1, the side wall distal edges 56 allow for inteference-free pivotal movement of the pivotable section 28 while the pivotable section side walls 45 extend between the ventilator base section peripheral wall 24 and the base section side walls 34 when the ventilator base section peripheral wall 24 is operationally mounted on the jack 10.

In other words, the side wall distal edges 56 are configured and sized not only to allow for clearance of the pivotable section 28 as the latter pivots but also to insure that the pivotable section side walls 46 are sufficiently sized so as to cover the spacing that may be created between the ventilator base section peripheral wall 24 and the base section side walls 34 so as to prevent potential air leakage through the sides of the jack 10.

As illustrated more specifically in FIGS. 3 through 5, each side wall distal edge 56 has a substantially frusto-triangular configuration. Each side wall distal edge 56 typically includes a distal edge upper segment 58 extending substantially rearwardly and downwardly from the pivotable section upper peripheral edge 52. Each side wall distal edge 56 typically also includes a distal edge lower segment 60 extending substantially rearwardly and upwardly from the pivotable section lower peripheral edge 54. Each side wall distal edge 56 typically further includes a distal edge intermediate segment 62 extending between the distal edge upper and lower segments 58, 60. As shown more specifically in FIG. 4, the position, configuration and size of the distal edge lower segment 60 allows the pivotable section side walls 46 to pivot towards the retracted configuration without interfering with the attachment flange 50. Also, the configuration, position and size of the distal edge upper segment 58 allows the pivotable section side walls 46 to be in the retracted configuration shown in FIG. 4 without interfering with the ventilator base section peripheral wall 24. The configuration and size of the distal edge upper and lower segments 58, 60 also allows interference-free pivotal movement of the pivotable section 28 as shown in FIG. 5.

The distal edge upper segment 58 forms an upper segment-to-upper edge angle with the pivotable section upper peripheral edge 52. Typically, although by no means exclusively, the upper segment-to-upper edge angle has a value of approximately 135 degrees. The distal edge lower segment 60 forms a lower segment-to-lower edge angle with the pivotablle section lower peripheral edge 54. Typically, although by no means exclusively, the lower segment-to-lower edge angle has a value of approximatley 54 degrees. The distal edge intermediate segment 62 typically extends in a substantially parallel relationship relative to the pivotable section rear wall 44.

As illustrated more specifically in FIG. 3, the pivotable and base section front walls 44, 30 are typically attached to each other so as to be in a substantially co-planar relationship relative to each other when the pivotable section front wall 44 is in a the extended configuration. Typically, the pivotable section front wall 44 extends integrally from the base section front wall 30. In at least one embodiment of the invention, the pivotable and base section front walls 44, 30 are pivotable relative to each other about a base-to-pivotable section fold line 64.

The jack 10 typically further includes a position lock for selectively locking the base and pivotable section front walls 30, 44 in a predetermined angular relationship relative to each other. The position lock typically includes an inner lock configured and positioned so as not to protrude outwardly from the base and pivotable sections 26, 28. The configuration and position of the inner lock hence allows mounting of the ventilator base section peripheral wall 24 in a substantially adjacent relationship over at least a portion of the base and pivotable sections 26, 28 so as to provide a substantially seal-type fit therebetween. In other words, since the inner lock is configured and positioned so as not to protrude outwardly from the base and pivotable sections 26, 28, the jack 10 may be configured so as to be in a substantially seal-type fit with the ventilator base section peripheral wall without interfering with the latter.

Figure 8:
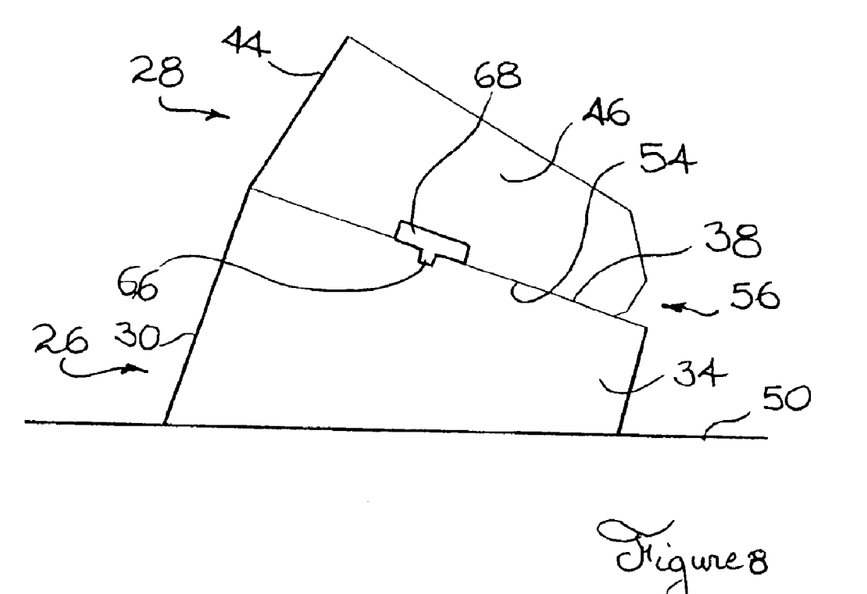
FIG. 8, in a partial transversal cross-sectional view taken along arrows A—A of FIG. 7, illustrates some of the features of the adjustable roof ventilator jack shown in FIG. 7.
Figure 9:
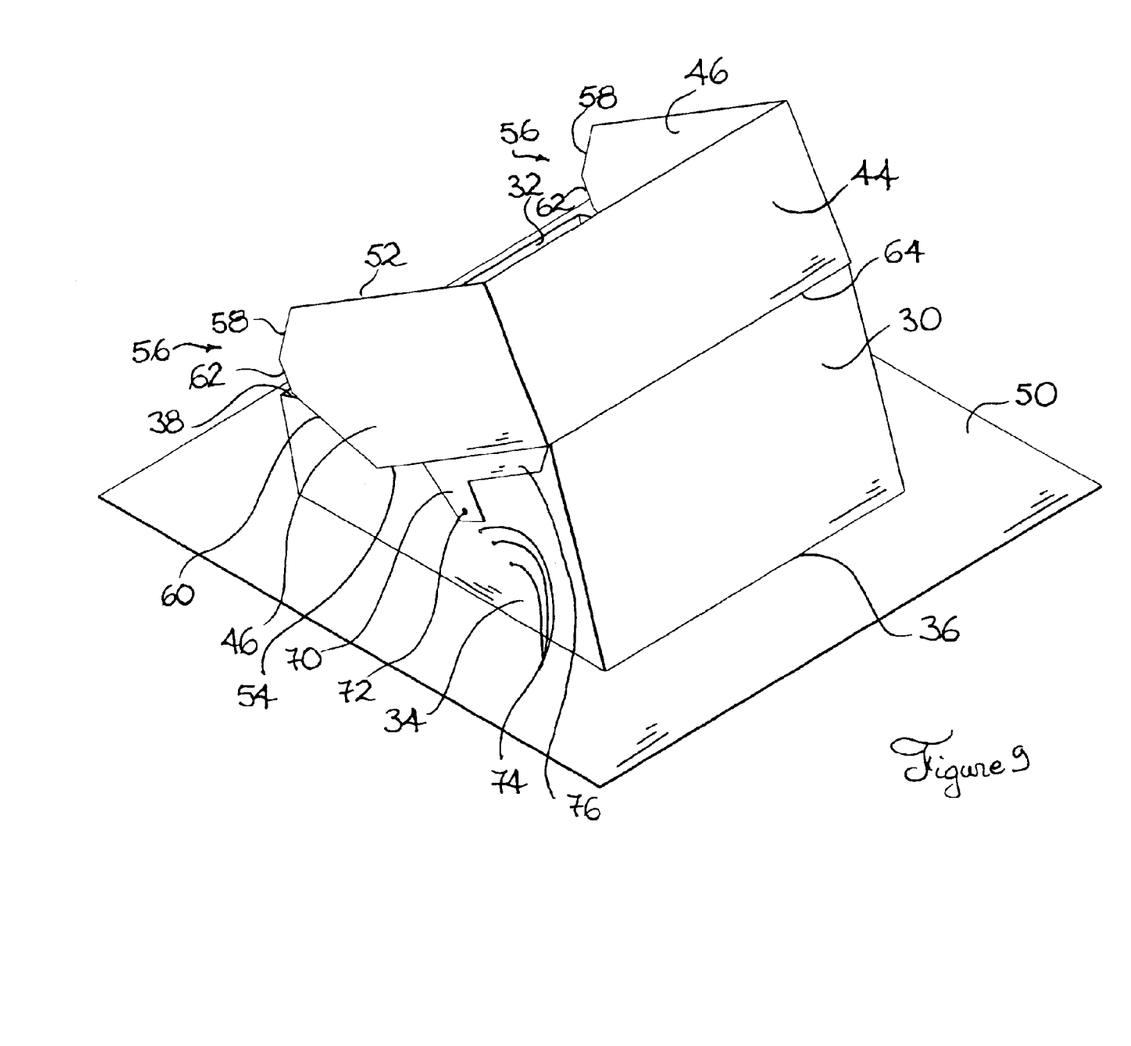
FIG. 9, in a rear-top perspective view, illustrates an adjustable roof ventilator jack in accordance with an embodiment of the present invention.

As illustrated more specifically in FIG. 8, in at least one embodiment of the invention, the inner lock includes an inner locking tongue 66 extending from the inner surface of at least one and preferably both of the pivotable section side walls 46. Each inner locking tongue 66 is configured, positioned and sized for be hooked over a corresponding section of the base section upper peripheral edge 38 so as to lock the pivotable section 28 in the extended configuration. The inner locking tongue 66 typically extends inwardly and substantially downwardly from an inner tongue attachment plate 68. The inner tongue attachment plate 68 is secured to the inner surface of a corresponding pivotable section side wall 46.

Typically, the position lock includes at least one and preferably two outer locking tongues 70 extending from corresponding pivotable section side walls 46. Each outer locking tongue 70 has a corresponding outer tongue aperture 72 extending therethrough.

The position lock also includes at least one position locking aperture 74 extending through a corresponding base section side wall 34. The outer tongue and position locking apertures 72, 74 are configured, positioned and sized so as to be substantially in register with each other when the pivotable section 28 is in a predetermined angular relationship relative to the base section 26. The outer tongue and position locking apertures 72, 74 are adapted to receive a locking component such as a locking pin, screw, bolt, nail or the like for locking the pivotable and base sections 28, 26 in the predetermined angular relationship relative to each other.

Typically, each outer locking tongue 70 extends from a corresponding outer tongue attachment plate 76. Each outer tongue attachment plate 76 is secured to a corresponding pivotable section side wall 46.

Each outer tongue attachment plate 76 is typically attached to the inner surface of a corresponding pivotable section side wall 46 so that the outer locking tongue 76 lies in a substantially adjacent relationship with the outer surface of a corresponding base section side wall 34.

Typically, the position lock includes a plurality of position locking apertures 74 extending through the both base section side wall 34, the position locking apertures 74 are configured, positioned and sized so as to be substantially in register with a corresponding outer tongue aperture 72 when the pivotable section 28 is in one of a predetermined angular position relative to the base section 26. Typically, the predetermined angular relationships between the pivotable and base sections 28, 26 corresponding to positions of registry between the outer tongue and position locking apertures 72, 76 are calibrated for predetermined roof slopes.

Accordingly, the jack 10 is typically further provided with position indicia 78 written, carved, stamped or otherwise marked adjacent corresponding position locking apertures 74 for facilitating the selection of a given position locking aperture 74 depending on the slope of the roof on which the roof ventilator 12 is to be installed. Hence, the jack 10 is typically provided with a position determining means for facilitating the determination of the required angular relationship between the base and pivotable sections 26, 28 for a given slope of the roof on which the roof ventilator is to be installed. The position determining means allows for the pivotable section 28 to be locked in a required angular relationship relative to the base section 26 prior to the jack 10 being mounted on the roof 16.

In use, the pivotable section 28 may be set at a suitable angle relative to the base section 26 prior to the jack 10 being installed on the roof 16. Once positioned on the roof 16, the attachment flange 50 is secured to the latter using suitable attachment means. The roof ventilator 12 may then be secured to the jack 10 using suitable attachment means such as a bolts, rivets, adhesives or the like.

Once installed, the jack 10 couples the ventilation aperture 14 to the roof ventilator 12 without substantially obstructing the flow of air regardless of the angular relationship between the pivotable and base sections 26, 28.

I claim:

1. An adjustable roof ventilator jack for operationally coupling a roof ventilator to a venting aperture extending through a roof, said roof having a roof slope adjacent said venting aperture, said roof ventilator having a ventilator base section including a ventilator base section peripheral wall; said roof ventilator jack comprising:

a base section, said base section including a base section front wall, a substantially opposed base section rear wall and a pair of substantially opposed base section side walls extending between said base section front and rear walls, said base section defining a base section lower peripheral edge and an opposed base section upper peripheral edge, said base section lower peripheral edge extending in a base reference plane;

a pivotable section including a pivotable section front wall and a pair of pivotable section side walls extending substantially rearwardly from said pivotable section front wall, said pivotable section front wall being pivotally attached to said base section for pivotal movement between an extended configuration wherein said pivotable and base section front walls are in a substantially parallel relationship relative to each other and a retracted configuration wherein the inner surface of said pivotable and base section front walls form an obtuse pivotable-to-base section angle;

the inner surface of said pivotable and base section front walls form a pivotable-to-base section angle having a value smaller than 180 degrees, the distance between said base section upper and lower peripheral edges being greater about said base section front wall than about said base section rear wall;

a position lock for selectively locking said base and pivotable section front walls in a predetermined angular relationship relative to each other.

2. An adjustable roof ventilator jack as recited in claim 1, further comprising a jack-to-roof attachment for attaching said base section to said roof.

3. An adjustable roof ventilator jack as recited in claim 2, wherein said jack-to-roof attachment means includes an attachment flange extending substantially outwardly from said base section substantially adjacent said base section lower peripheral edge.

4. An adjustable roof ventilator jack as recited in claim 3, wherein said attachment flange extends substantially in said base reference plane.

5. An adjustable roof ventilator jack as recited in claim 3, wherein said attachment flange extends integrally from said base section adjacent said base section lower peripheral edge.

6. An adjustable roof ventilator jack as recited in claim 1, wherein said pivotable section defines a pivotable section upper peripheral edge and a substantially opposed pivotable section lower peripheral edge, said pivotable section upper and lower peripheral edges being in a substantially parallel relationship relative to said base section upper peripheral edge when said pivotable section front wall is in said extended configuration.

7. An adjustable roof ventilator jack as recited in claim 6, wherein each of said pivotable section side walls defines a corresponding side wall distal edge located substantially opposite pivotable front wall, each of said side wall distal edges being configured and sized so as to provide clearance for said pivotable section as said pivotable section front wall pivots between said extended and retracted configurations while said pivotable section side walls prevent leakage when said ventilator base section peripheral wall is operatively mounted on said roof ventilator jack.

8. An adjustable roof ventilator jack as recited in claim 7, wherein at least one of said side wall distal edges has a substantially frusto-triangular configuration defining
- a distal edge upper segment extending substantially rearwardly and downwardly from said pivotable section upper peripheral edge;
- a distal edge lower segment extending substantially rearwardly and upwardly from said pivotable section lower peripheral edge;
- a distal edge intermediate segment extending between said distal edge upper and lower segments.

9. An adjustable roof ventilator jack as recited in claim 8, wherein
- said distal edge upper segment forms an upper segment-to-upper edge angle with said pivotable section upper peripheral edge, said upper segment-to-upper edge angle having a value of approximately 135 degrees;
- said distal edge lower segment forms a lower segment-to-lower edge angle with said pivotable section lower peripheral edge, said lower segment-to-lower edge angle having a value of approximately 135 degrees;
- said distal edge intermediate segment extends in a substantially parallel relationship relative to said pivotable section rear wall.

10. An adjustable roof ventilator jack as recited in claim 1, wherein said pivotable and base section front walls are pivotally attached to each other so as to be in a co-planar relationship relative to each other when said pivotable section front wall is in said extended configuration.

11. An adjustable roof ventilator jack as recited in claim 1, wherein said pivotable section front wall extends integrally from said base section front wall, so as to define a base-to-pivotable section fold line therebetween, said pivotable and base section front walls being pivotable relative to each other about said base-to-pivotable section fold line.

12. An adjustable roof ventilator jack as recited in claim 1, wherein said position lock includes an inner lock, said inner lock being configured and positioned so as not to protrude outwardly from said base and pivotable sections; whereby said inner lock allows said ventilator base section peripheral wall to be mounted in a substantially adjacent relationship over at least a portion of said base and pivotable sections without interfering with the latter so as to allow for a substantially tight fit between said ventilator base section peripheral wall and said at least a portion of said base and pivotable sections when said roof ventilator is operationally mounted on said ventilator jack.

13. An adjustable roof ventilator jack as recited in claim 12, wherein said inner lock includes an inner locking tongue extending from the inner surface of at least one of said pivotable section side walls, said inner locking tongue being configured, positioned and sized for being hooked over a corresponding section of said base section upper peripheral edge so as to lock said pivotable section in said extended configuration.

14. An adjustable roof ventilator jack as recited in claim 13, wherein said inner locking tongue extends from an inner tongue attachment plate, said inner tongue attachment plate being secured to the inner surface of a corresponding pivotable section side wall.

15. An adjustable roof ventilator jack as recited in claim 1, wherein said position lock includes
- an outer locking tongue extending from a corresponding pivotable section side wall, said outer locking tongue having an outer tongue aperture extending therethrough;
- a position locking aperture extending through a corresponding base section side wall;
- said outer tongue and position locking apertures being configured, positioned and sized so as to be substantially in register with each other when said pivotable section is in a predetermined angular relationship relative to said base section;
- whereby said outer tongue and position locking apertures are adapted to receive a locking component for locking said pivotable and base sections in said predetermined angular relationship relative to each other.

16. An adjustable roof ventilator jack as recited in claim 15, wherein said outer locking tongue extends from an outer tongue attachment plate, said outer tongue attachment plate being secured to a corresponding pivotable section side wall.

17. An adjustable roof ventilator jack as recited in claim 16, wherein said outer tongue attachment plate is secured to the inner surface of said corresponding pivotable section side wall so that said outer locking tongue lies in a substantially adjacent relationship with the outer surface of a corresponding base section side wall.

18. An adjustable roof ventilator jack as recited in claim 15, wherein said position lock includes at least two position locking apertures extending through a corresponding base section side wall; said outer tongue and at least two position locking apertures being configured, positioned and sized so that a predetermined one of said at least two position locking apertures is substantially in register with said outer tongue aperture when said pivotable section is in a predetermined angular relationship relative to said base section.

19. An adjustable roof ventilator jack as recited in claim 18, further comprising a position indicia for facilitating the selection of a given position locking aperture depending on the slope of the roof on which said roof ventilator is to be installed.

20. An adjustable roof ventilator jack as recited in claim 1, further comprising a position determining means for facilitating the determination of the required angular relationship between said base and pivotable sections for a given slope of the roof on which said roof ventilator is to be installed; whereby said position determining means allows for said pivotable section to be locked in said required angular relationship prior to said adjustable roof ventilator jack being mounted on said roof.

\* \* \* \* \*